(12) United States Patent
Duval

(10) Patent No.: US 12,277,933 B2
(45) Date of Patent: Apr. 15, 2025

(54) SYSTEMS AND METHODS FOR MOBILE SPEECH THERAPY

(71) Applicant: The Regents of the University of California, Oakland, CA (US)

(72) Inventor: Jared Duval, Santa Cruz, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 477 days.

(21) Appl. No.: 17/648,798

(22) Filed: Jan. 24, 2022

(65) Prior Publication Data

US 2022/0238110 A1  Jul. 28, 2022

Related U.S. Application Data

(60) Provisional application No. 63/141,329, filed on Jan. 25, 2021.

(51) Int. Cl.
*G10L 15/22* (2006.01)
*G06T 13/80* (2011.01)
(Continued)

(52) U.S. Cl.
CPC .............. *G10L 15/22* (2013.01); *G06T 13/80* (2013.01); *G10L 15/005* (2013.01); *G10L 15/063* (2013.01); *G10L 2015/225* (2013.01)

(58) Field of Classification Search
CPC ..... G10L 15/22; G10L 15/005; G10L 15/063; G10L 2015/225; G10L 17/00; G06T 13/80; A63F 13/35; A63F 13/67; A63F 13/215
See application file for complete search history.

(56) References Cited

U.S. PATENT DOCUMENTS 10,300,394 B1\* 5/2019 Evans ..................... A63F 13/86
2014/0220520 A1 8/2014 Salamini et al.
(Continued)

FOREIGN PATENT DOCUMENTS

WO 2016109334 A1 7/2016

OTHER PUBLICATIONS

Duval, J. et al., "Spokelt: Building a Mobile Speech Therapy Experience," MobileHCI '18: Proceedings of the 20th International Conference on Human-Computer Interaction with Mobile Devices and Services, Sep. 3, 2018, New York, New York, 12 pages.
(Continued)

*Primary Examiner* — Pierre Louis Desir
*Assistant Examiner* — Keisha Y. Castillo-Torres
(74) *Attorney, Agent, or Firm* — McCoy Russell LLP

(57) ABSTRACT

A computer-implemented method can include: an audio input device of a portable electronic device receiving verbal speech input from a user and converting the received verbal speech input into an audio input signal; an online processing module of the portable electronic device performing at least one speech recognition operation on the audio input signal; an offline processing module of the portable electronic device performing at least one speech recognition operation on the audio input signal; an interactive game module of the portable electronic device generating user feedback based on results from the at least one speech recognition operation performed by the online processing module and the at least one speech recognition operation by the offline processing module; and a user interface of the portable electronic device providing the user feedback to the user.

29 Claims, 12 Drawing Sheets

(51) Int. Cl.
  *G10L 15/00*   (2013.01)
  *G10L 15/06*   (2013.01)

(56) References Cited

U.S. PATENT DOCUMENTS

| | | | | |
|---|---|---|---|---|
| 2015/0154492 | A1* | 6/2015 | Ponomarev | H04L 67/10 |
| | | | | 706/11 |
| 2017/0287356 | A1* | 10/2017 | Stephen | G09B 7/06 |
| 2018/0190269 | A1 | 7/2018 | Lokeswarappa et al. | |
| 2018/0211668 | A1* | 7/2018 | Willett | G10L 15/30 |
| 2020/0402420 | A1* | 12/2020 | Haruta | A61B 5/16 |

OTHER PUBLICATIONS

"Kraw Lecture Series: Universal Access & Serious Games—Technology, Disability, and Social Good," YouTube Website, Available Online at https://www.youtube.com/watch?v=9_fJ2OXDNf8&t=12s, Jan. 16, 2019, 4 pages.

Stephens, T., "Smile Train partners with UC Santa Cruz researchers on speech therapy game," UC Santa Cruz News Center Website, Available Online at https://news.ucsc.edu/2019/03/speech-therapy-game.html, Mar. 11, 2019, 3 pages.

"Spoke It: The Game," Spoke It the Game Website, Available Online at https://spokeitthegame.com/, Available as Early as Mar. 24, 2019, 9 pages.

ISA Korean Intellectual Property Office, International Search Report and Written Opinion Issued in Application No. PCT/US2022/070324, May 17, 2022, WIPO, 15 pages.

* cited by examiner

SYSTEMS AND METHODS FOR MOBILE SPEECH THERAPY

CROSS REFERENCE TO RELATED APPLICATION

The present application claims priority to U.S. Provisional Application No. 63/141,329, entitled "SYSTEMS AND METHODS FOR MOBILE SPEECH THERAPY," and filed on Jan. 25, 2021. The entire contents of the above-listed application are hereby incorporated by reference for all purposes.

GOVERNMENT SUPPORT

This invention was made with government support under Grant Number 1617253 awarded by the National Science Foundation. The government has certain rights in the invention.

TECHNICAL FIELD

This disclosure is directed to systems and methods for performing speech therapy, and more particularly to mobile device games in connection with speech therapy.

BACKGROUND

Speech is a crucial skill for effective communication, expression, and sense of self efficacy. Speech impairments often co-occur with developmental disabilities such as Autism Spectrum Disorder, Cerebral Palsy, and Downs Syndrome. The prevalence of speech impairments in individuals with developmental disabilities has been as high as 51%. Each of these developmental disabilities exhibit symptoms of an articulation disorder. As used herein, an articulation disorder is categorized as having difficulty producing speech sounds that constitute the fundamental components of a language. Many individuals with speech impairments experience depression, social isolation, and an overall lower quality of life. Speech problems can negatively impact a person's employment status and their ability to receive proper healthcare, for example. This includes receiving a wrong diagnosis, inappropriate medication, and limited access to services. The rate of arrests and convictions is typically higher for boys with language impairments. It is estimated that approximately 10% of the U.S. adult population experiences a speech, language, or voice problem.

Speech is a skill that can often be improved with individualized therapy and practice. Access to Speech Language Pathologists (SLPs) is crucial to improving speech, but up to 70% of SLPs have waiting lists indicating a shortage in the workforce and disrupted access to therapy. As a result, many non-professional therapists are being trained by SLPs to deliver speech therapy outside of the office. This is not an ideal situation because the SLP must take the time to train the non-professional speech therapy facilitator; the individual's therapy schedule then relies on the facilitator's schedule, and these facilitators may not be as effective at delivering a speech curriculum. Even worse, many untrained facilitators attempt to deliver speech curriculums reporting a general low sense of competence in assisting people with disabilities in their assigned curriculums.

Mobile speech therapy games can help people practice articulation anywhere without the need to be facilitated, which may potentially expedite their speech therapy progress. The pervasiveness of mobile hardware makes it an ideal platform for delivering speech therapy to those who may not have access to a speech therapist or a facilitator. Many SLPs design games and activities to engage their clients. Games and play have been widely recognized as a valid motivator for otherwise jaded individuals. There may be benefits to using a mobile speech therapy game, including the ability to practice anywhere, collect fine-grained speech data, track the frequency and time individuals spend practicing, track performance over time, and create dynamic, custom therapies to each individual. This has presumably motivated the appearance of many mobile speech therapy apps with different features and function. Yet, such apps tend to require a facilitator to evaluate speech. Speech recognition has been successfully used to facilitate speech therapy, but not in a mobile context focusing on articulation.

Adults with developmental disabilities co-occurring with speech impairment would benefit from speech therapy. There is a trend towards helping children with speech impairments, but adults with speech impairments need support as well.

Autism Spectrum Disorder (ASD) is one of the most common developmental disabilities, affecting approximately 400,000 individuals in the United States. A follow-up study was conducted on children with ASD and communication problems when they reached early adulthood showing that the group continued to show significant stereotyped behavior patterns, problems in relationships, troubles with employment, and lack of independence. A person with ASD may have monotonic (machine-like) intonation, deficits in pitch, vocal quality, volume, and articulation distortion errors.

A person with Cerebral Palsy and dysarthria (difficult or unclear articulation of speech that is otherwise linguistically normal) may include anterior lingual place (front of the tongue) inaccuracy, reduced precision of fricative (consonant requiring breath through a small opening) and affricative (Plosive followed by fricative sound like j as in jam) manners, slowness of speech, and indistinctness of speech.

Many people with Down Syndrome have muscle hypotonia, which may cause abnormal movement of the cheek, lips, and tongue, resulting in articulation errors. Many people with Down Syndrome also speak at a fast and fluctuating rate known as cluttering.

Each of the aforementioned developmental disabilities have one general symptom in common—an articulation disorder. For this reason, development of a critical speech recognition system capable of distinguishing between correct and incorrect pronunciations is needed.

Games can be used as effective educational interventions and have the ability to teach while providing a motivating and interactive environment, and can be as effective as face-to-face instruction. They can create opportunities to train new skills in a safe and engaging environment, improving perceived self-efficacy, a key aspect in health promotion interventions.

Multiple serious games for health are documented to be effective for diverse platforms, health outcomes, and target populations. Some examples that populate this space range from an exergame to help blind children with balance to embodied persuasive games for adults in wheelchair to mobile games for motivating tobacco-free life in early adolescence.

Games are such a powerful motivator that non-game activities are often designed to look like games (i.e. gamified systems). This attracts user attention and entices engagement, which is particularly useful for tedious and otherwise non-interesting activities. By adding game design elements to a pre-existing activity, designers manage to engage people more with this activity. However, traditional gamification approaches have been widely criticized. Simply adding superficial game-looking elements to an otherwise tedious activity does not work in the long run. Extrinsic rewards like those typically used in gamification can decrease intrinsic motivation and engagement after the initial novelty effect. A more fruitful approach may include making the activity intrinsically motivating and the rewards meaningful to the player.

Thus, there remains a need for improved systems and methods pertaining to speech therapy.

SUMMARY

Certain implementations of the disclosed technology are directed to a mobile serious game for health designed to support speech articulation therapy, which uses a novel offline critical speech recognition system capable of providing feedback in real-time. Functional requirements may be based on user feedback, relevant reward systems to implement based on user interest, and insights on the preferred hybrid game structure, which can be useful to others designing mobile games for speech articulation therapy for a similar target group.

Certain implementations of the disclosed technology are directed to a cleft speech therapy game that addresses the needs of a large community of people who receive, do not receive, or provide speech therapy. The game may be used by children aged 4-10 with cleft speech, for example, as well by parents, caretakers, and medical professionals for curriculum customization, progress reports, and integrated at-home play.

DETAILED DESCRIPTION

Figure 1:
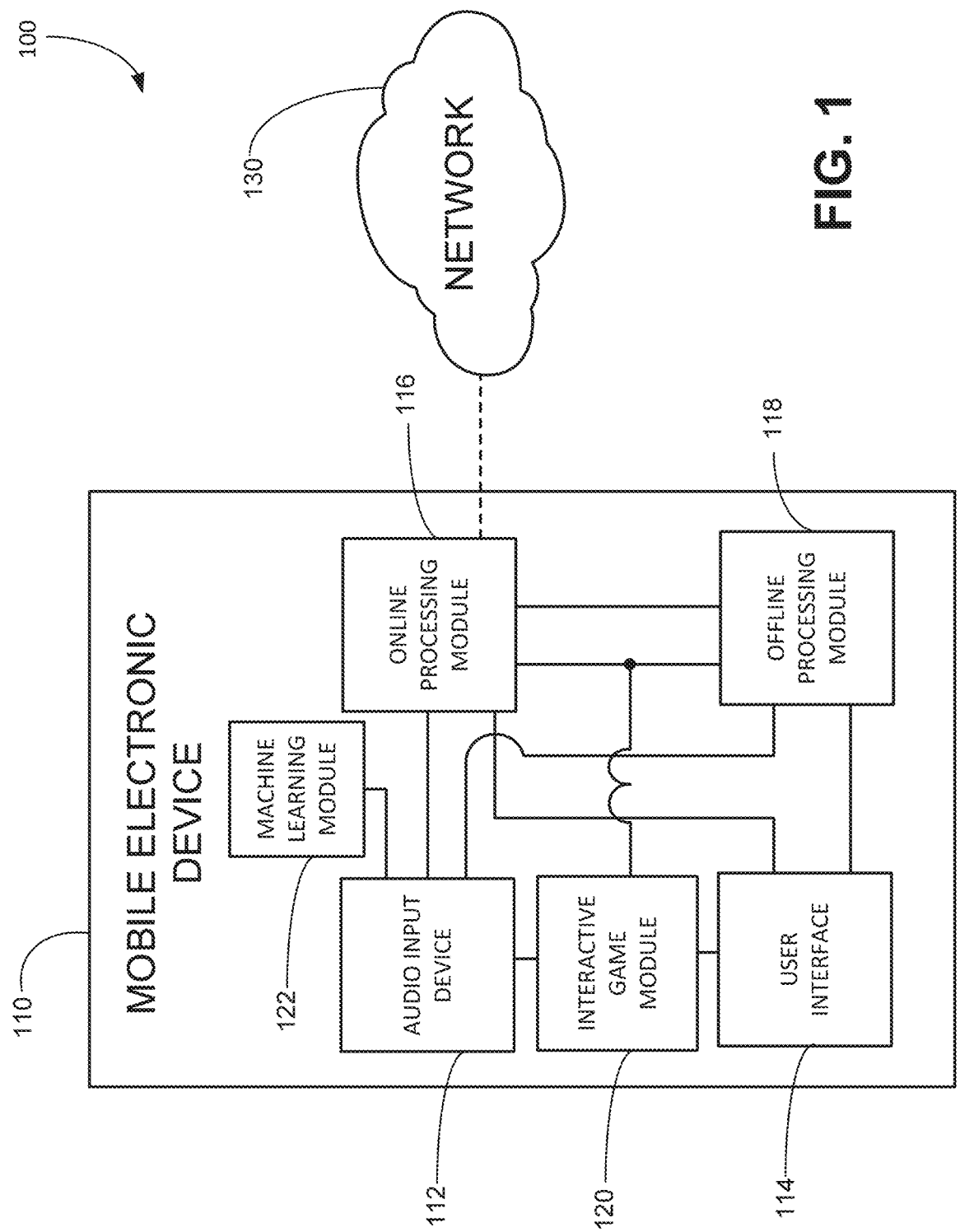
FIG. 1 illustrates an example of a speech therapy system in accordance with certain implementations of the disclosed technology.

Certain implementations of the disclosed technology (generally referred to herein as "SpokeIt") may advantageously electronically facilitate speech therapy curriculums, evaluate speech performance by diagnosing speech errors common to the cleft population, and provide a motivating context to help certain patients, such as children with cleft, meet their speech therapy goals.

SpokeIt is the first and only mobile application that is able to critically diagnose speech both with and without a network, e.g., Internet, connection. SpokeIt may employ a perpetual cyclical narrative intended to keep SpokeIt engaging for as long as speech therapy is needed. SpokeIt may employ custom lip-sync animations that "shows" children speech placement. A machine learning module may be used to enhance detection of the age of speakers, resonance errors, and articulation errors, for example.

Prior attempts include storybook style narratives that were expensive, had low replayability and had lower speech engagement, and fast-paced arcade-style games were simply not engaging enough. SpokeIt's hybrid structure has many benefits that mitigate or overcome the various shortcomings and disadvantages of the prior attempts.

With SpokeIt, third parties can override the speech system and grade speech themselves (or create entirely new rules and games). This makes SpokeIt particularly valuable to medical professionals who want control over assessment but would like to use the game to provide target words and a motivational context to practice speech.

In certain implementations, SpokeIt may use an underlying framework of a design that manages two independent speech systems that work in tandem with each other, machine learning outcomes, the flow of the game, use of the controller, interaction design, appropriate feedback, dynamically adjusted challenge based on performance, appropriate selection of target words, and common functions needed throughout all of the mini-games.

Certain implementations are directed to a critical speech recognition system in a game designed for on-the-go or at-home use. While prior speech recognition systems exist, such as those used in personal assistants like Cortana, Ski, Google Assistant, and Amazon Alexa, such digital assistants are designed to best guess speech, not listen to it critically. The disclosed technology advantageously enables the ability to fine-tune the recognition to listen for incorrect speech as well as correct utterances.

Certain implementations include a solution that can offline which is advantageous because of the involvement of sensitive speech data. In addition, not every home has access to the Internet. Also, online speech recognition systems often have lag and usage caps that would hinder real-time game play.

Implementations may include mobile speech recognition libraries that are highly customizable and do not require an Internet connection. The libraries may use customizable dictionaries that allow developers to customize the targets that can be recognized and may use ARPAbet, a set phonetic transcription codes, to map speech sounds to English words. ARPAbet can be used to construct any sequence of phonetic sounds to a word—even words that do not exist. Any set of sounds that an English speaker can produce can be mapped to an ARPAbet representation. The system can make new "words" that map to common mispronunciations of correct words. Providing both correct ARPAbet codes and ARPAbet codes that represent mispronunciations enables the ability to distinguish between correct and incorrect speech. Table 1 below shows ARPAbet codes that represent both correct and incorrect ways to say the word balloon.

| Common pronunciations of "Balloon" | ARPAbet Code |
|---|---|
| Balloon | B AH L UWN |
| Walloon | W AH L UW N |
| Walloo | W AH L UW |
| Bawoon | BAH UW N |
| Balloo | B AH L UW |
| Bawoo | B AH UW |
| Alloon | AH L UW N |
| Loon | L UW N |

1.

Certain implementations may use acoustic models to map sound data to targets in the dictionary. These acoustic models may be hot-swappable and can be altered for better accuracy, which creates the potential to alter acoustic models for specific populations, allowing a more accurate model that can listen to adults with developmental disabilities, or even one specifically for children with cleft speech. An open-source framework may be used to bring this power to portable, e.g., iOS, devices in native objective-c language for speed and reliability. A plugin may be used to provide the ability to listen to speech in real-time, which may be important for a responsive game. The disclosed technology provides many advantages including the ability to customize acoustic models, to customize dictionaries, to run offline, and to listen in real-time.

FIG. 1 illustrates an example of a speech therapy system 100 in accordance with certain implementations of the disclosed technology. In the example, the system 100 includes a mobile electronic device 110, such as a smartphone or tablet computing device, for example, that has an audio input device 112, such as a microphone, that is configured to receive verbal speech input from a user and convert the received verbal speech input into an audio input signal, and a user interface that is configured to provide the user feedback to the user. The mobile electronic device 110 also includes a machine learning module 122 that is configured to apply an acoustic model to the audio input signal received by the audio input device 112. The acoustic model may include a plurality of phonetic codes that each represent a certain pronunciation of at least one word, for example.

The mobile electronic device 110 also includes an online processing module 116 that is configured to perform at least one speech recognition operation on the audio input signal, and an offline processing module 118 that is configured to perform at least one speech recognition operation on the audio input signal. The online processing module 116 may interact with a network 130 such as the Internet. If access to the network 130 is unavailable, the mobile electronic device 110 may use only the offline processing module 118.

The mobile electronic device 110 also includes an interactive game module 120 that is configured to generate user feedback based on results from the at least one speech recognition operation performed by the online processing module 116 and the at least one speech recognition operation by the offline processing module 118. A user interface 114, such as a touchscreen, may be used to provide the user feedback to the user.

In certain implementations the system 100 may further include a storage device, e.g., local and/or remote, that is configured to store the user feedback.

Figure 2:
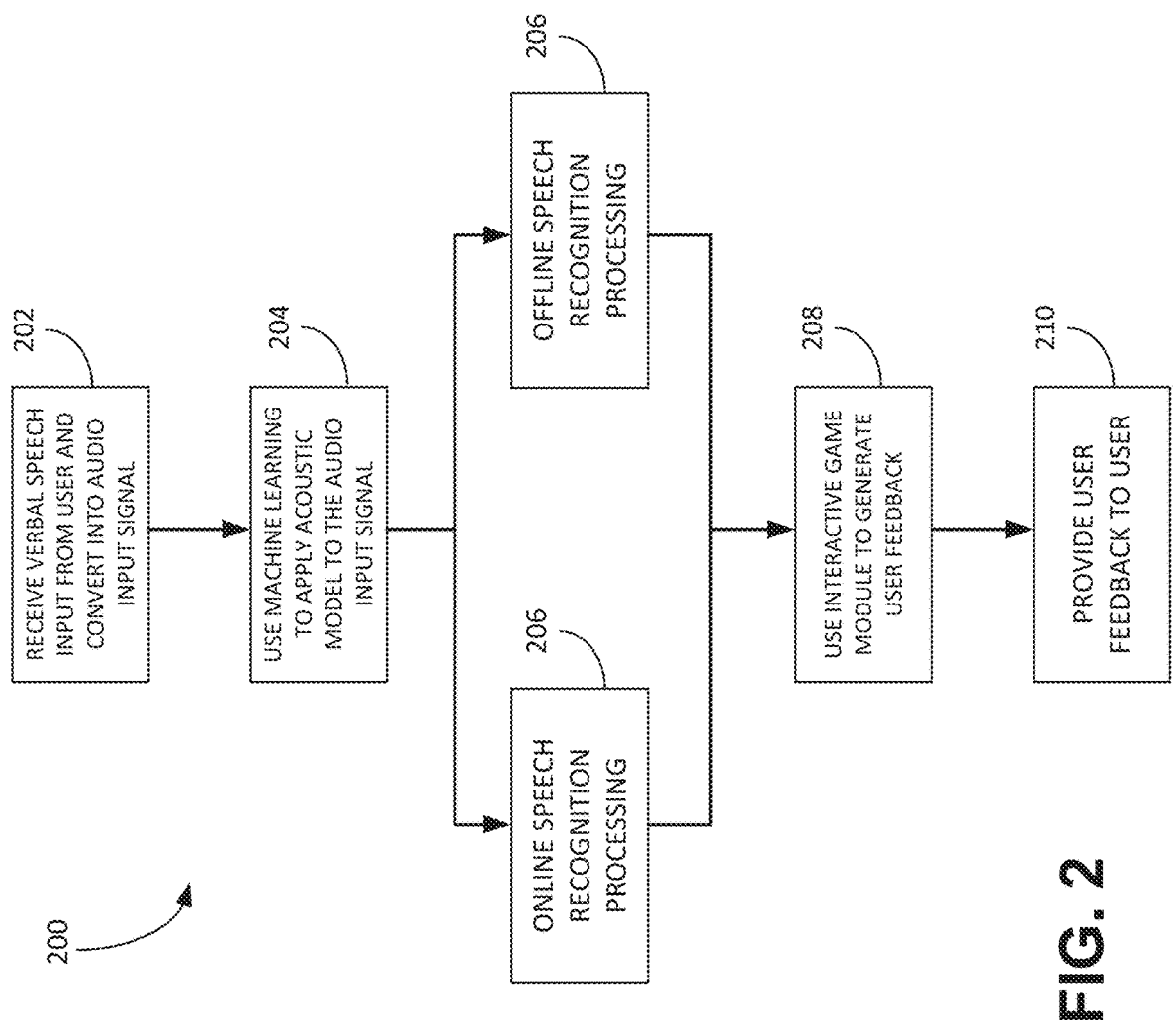
FIG. 2 illustrates an example of a computer-implemented method suitable for use with a portable electronic device in accordance with certain implementations of the disclosed technology.

FIG. 2 illustrates an example of a computer-implemented method 200 suitable for use with a portable electronic device in accordance with certain implementations of the disclosed technology. At 202, an audio input device of the portable electronic device receives verbal speech input from a user, such as a predetermined number of words or syllables, for example, and converts the received verbal speech input into an audio input signal. The received verbal speech input may be limited to a certain period of time and, responsive to the received verbal speech input exceeding the certain period of time, the method may further include starting another instance of the method with the additional verbal speech input as the received verbal speech input.

At 204, a machine learning module applies an acoustic model to the audio input signal. The acoustic model may include a plurality of phonetic codes that each represent a certain pronunciation of at least one word, for example. In certain implementations, the machine learning models are all offline, including the adult-child speech determination and the hyponasality/hypernasality detection. In such embodiments, the speech recognition for articulation error detection is the only online portion. However, while the models are typically used locally for increase speed and bandwidth, the offline models can be hosted on a server for online use.

At 206, an online processing module of the portable electronic device performs at least one speech recognition operation on the audio input signal. At 208, an offline processing module of the portable electronic device performs at least one speech recognition operation on the audio input signal.

At 210, an interactive game module of the portable electronic device generates user feedback based on results from the at least one speech recognition operation performed by the online processing module and the at least one speech recognition operation by the offline processing module. At 212, a user interface of the portable electronic device provides the user feedback to the user. The user feedback may include a visual cue indicating the determination that the user has started providing verbal speech input again, for example. In such embodiments, the visual cue may include removing a previously-presented visual cue that indicated a determination that the user had stopped providing verbal speech input.

The at least one speech recognition operation performed by the online processing module and the offline processing module may include any or all of the following: determining whether the user is an adult or a child based at least in part on results from the machine learning module applying the acoustic model to the audio input signal; determining a speech accent of the user based at least in part on results from the machine learning module applying the acoustic model to the audio input signal; determining a certain language of the verbal speech input based at least in part on results from the machine learning module applying the acoustic model to the audio input signal; and determining whether a speech error, such as an articulation error, hyponasality, or hypernasality, for example, is present in the verbal speech input based at least in part on results from the machine learning module applying the acoustic model to the audio input signal.

Certain implementations may further include determining whether the portable electronic device presently has an active connection with a network, such as the Internet. In such embodiments where the determination is that there is an active network connection, the portable electronic device may only use the online processing module to perform the at least one speech recognition operation; but if the determination is that there is not an active network connection, the portable electronic device may only use the offline processing module to perform the at least one speech recognition operation.

In certain implementations, the portable electronic device may be configured to toggle, e.g., in real-time, between the online processing module and the offline processing module based on results of the determining whether the portable electronic device presently has an active connection with a network.

In certain implementations, the user feedback may include an animated character speaking a reconstruction of the verbal speech input. In such embodiments, an animation module may generate the animated character based in part on a sprite sheet. The animation module may cause the animated character to perform a lip synchronization action in connection with the reconstruction of the verbal speech input.

Certain implementations may further include training the machine learning module using verbal samples, wherein each verbal sample is in one of a plurality of a spoken languages. This training may be concurrent with the performing of the speech recognition operations by the online and offline processing modules.

In certain implementations, converting the received verbal speech input into the audio input signal may include separating a voice of the user from background noise, e.g., in situations where the verbal speech input may be generated in a public area that has significant background noise, such as an airport, a residential building, an office building, a downtown area, a park, a school, or a speech therapist's office or area of practice, for example.

Certain implementations may further include restricting further operation of the method responsive to a determination as to whether the user is an adult.

Certain implementations may include determining whether the user has stopped providing verbal speech input. Responsive to a determination that the user has stopped providing verbal speech input, the system may: automatically pause or cease operation of the method; and optionally cause the user interface to provide to the user a request for response from the user.

Certain implementations may include pausing or ceasing operation of the method responsive to a determination that the user has not provided a response to the request for response within a predetermined period of time, e.g., 10 seconds. In such embodiments, the user feedback may include a visual cue indicating the determination that the user has stopped providing verbal speech input. Operation of the method may be automatically resumed responsive to a determination that the user has started providing verbal speech input again, e.g., for a predetermined period of time.

Certain implementations may include aggregating the user feedback with user feedback corresponding to other users. Alternatively or in addition thereto, the user feedback may include a score corresponding to the verbal speech input.

Certain implementations may include the portable electronic device pausing certain operations of the online processing module when the portable electronic device does not have an active connection with a network; such embodiments may further include the portable electronic device resuming certain operations of the online processing module when the portable electronic device establishes an active connection with a network, wherein resuming certain operations may include generating a score corresponding to the verbal speech input based on data obtained during the pausing.

Certain implementations may include using a storage device to store the user feedback. Such embodiments may further include allowing at least one other user to access the stored user feedback and/or transmitting the stored user feedback to another user, e.g., a speech specialist.

Figure 3:
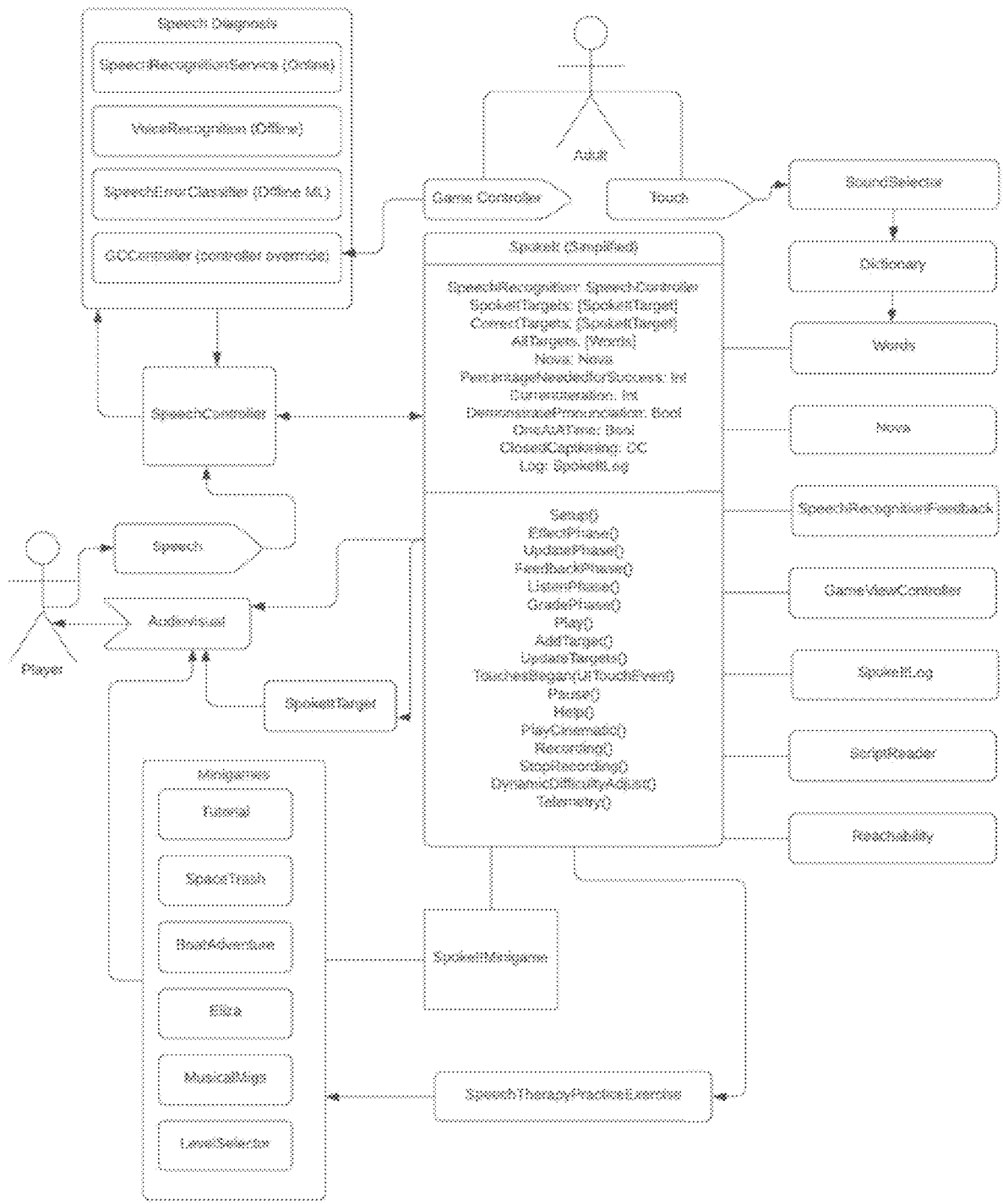
FIG. 3 illustrates an example of a speech therapy system architecture in accordance with certain implementations of the disclosed technology.

FIG. 3 illustrates an example of a speech therapy system architecture in accordance with certain implementations of the disclosed technology. In the example, a user (e.g., child) interacts with a speech controller and plays a speech therapy game selected from a plurality of minigames. An adult (e.g., parent or therapist of the user child) interacts with a game controller to monitor and interact with the user by way of the speech therapy game that is being played by the user. The illustrated architecture provides an example of multiple speech diagnosis tools that may be used in connection with the user playing the speech therapy game.

Figure 4:
FIGS. 4-6 together illustrate an example of a home screen for a speech therapy application in accordance with certain implementations of the disclosed technology.
Figure 5:
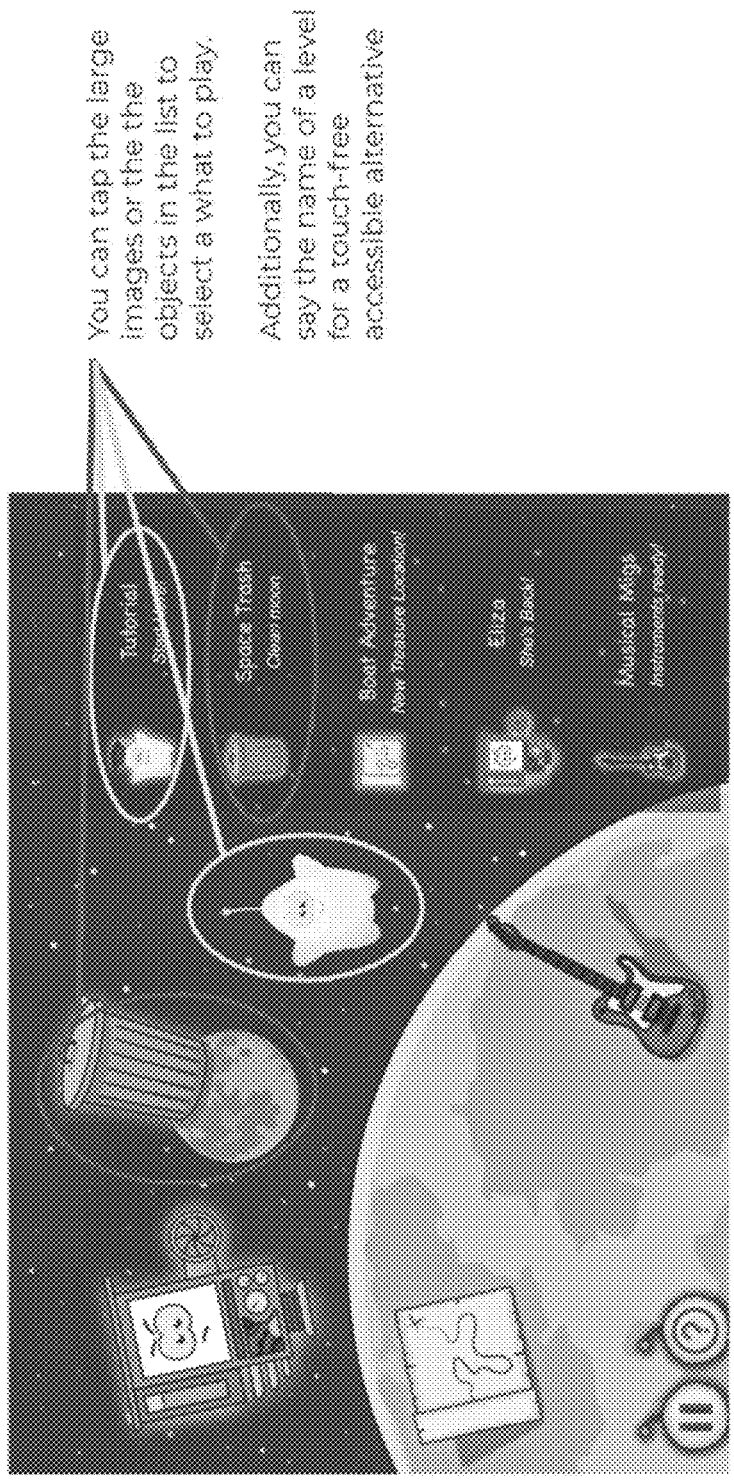
Figure 6:
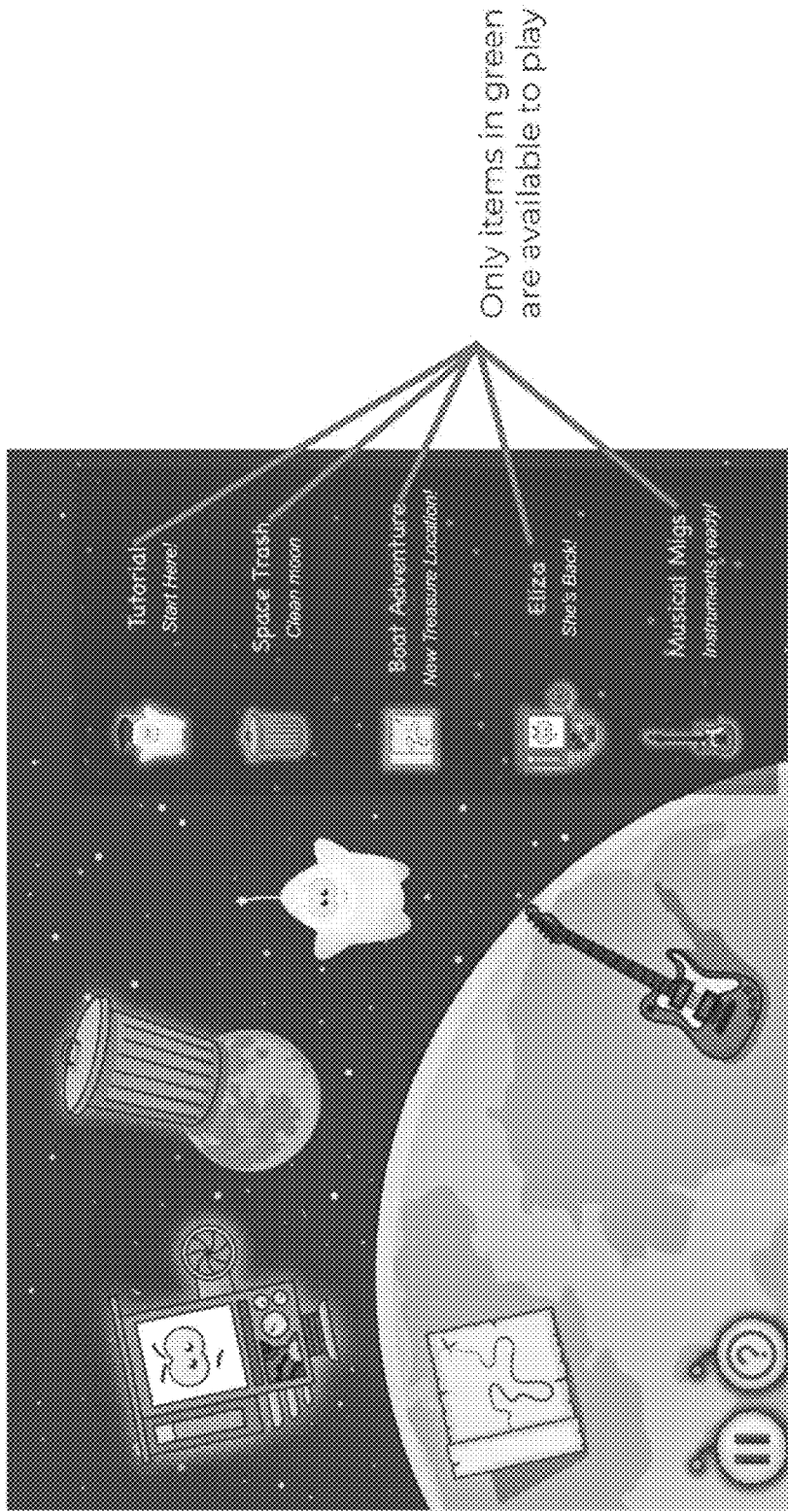

FIGS. 4-6 together illustrate an example of a home screen for a speech therapy application in accordance with certain implementations of the disclosed technology.

Figure 7:
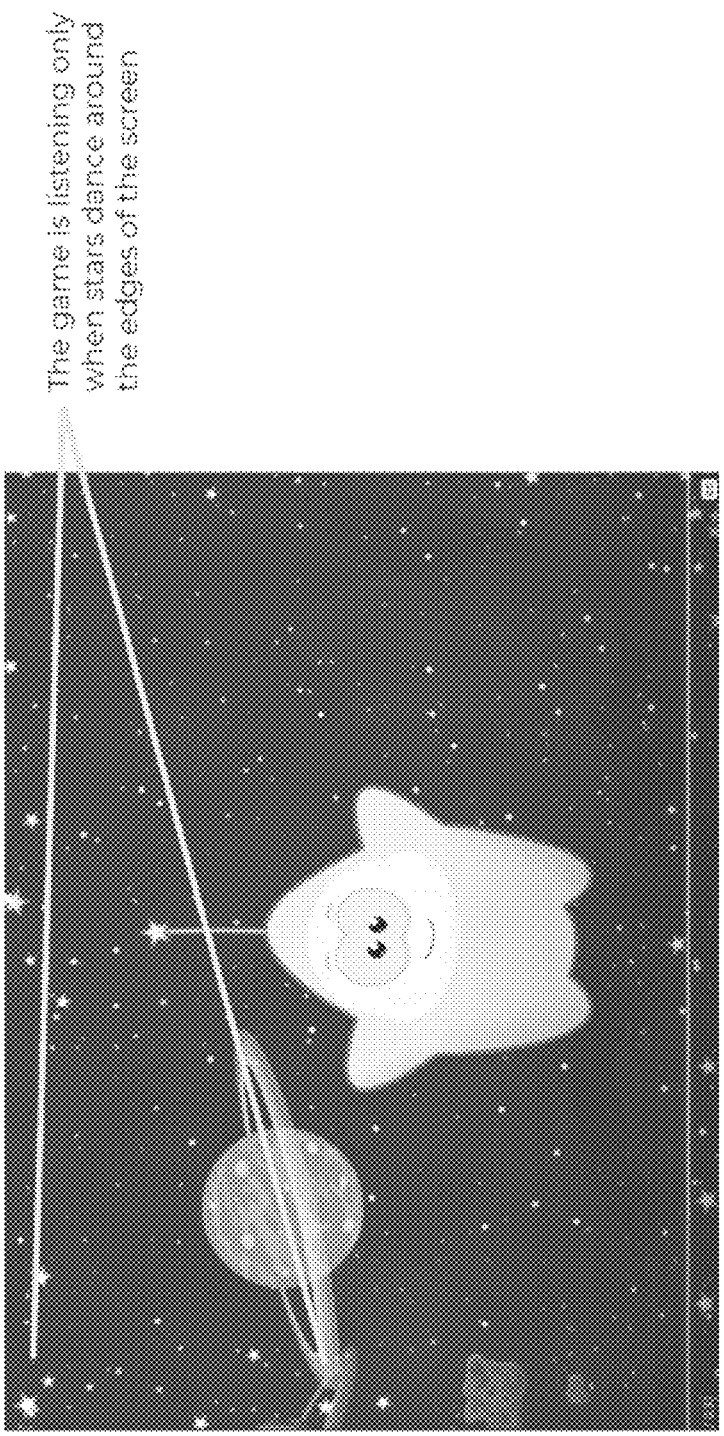
FIG. 7 illustrates a first example of game play for a speech therapy game of the speech therapy application in accordance with certain implementations of the disclosed technology.

FIG. 7 illustrates a first example of game play for a speech therapy game of the speech therapy application in accordance with certain implementations of the disclosed technology.

Figure 8:
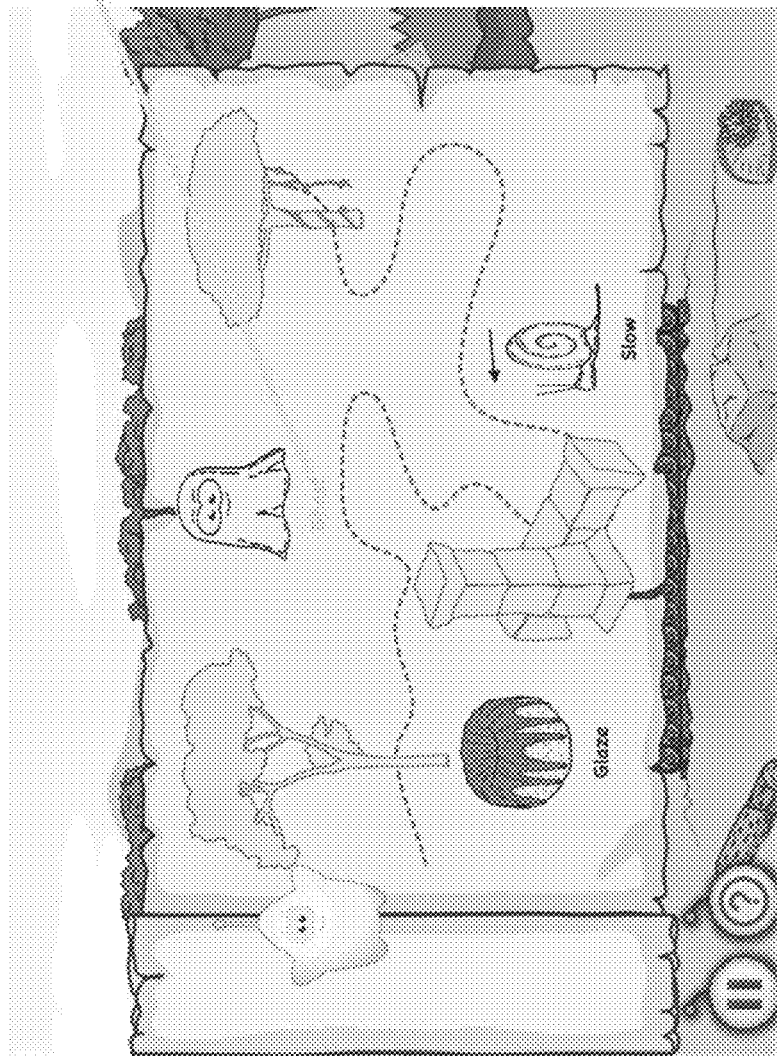
FIG. 8 illustrates a second example of game play for a speech therapy game of the speech therapy application in accordance with certain implementations of the disclosed technology.

FIG. 8 illustrates a second example of game play for a speech therapy game of the speech therapy application in accordance with certain implementations of the disclosed technology.

Figure 9:
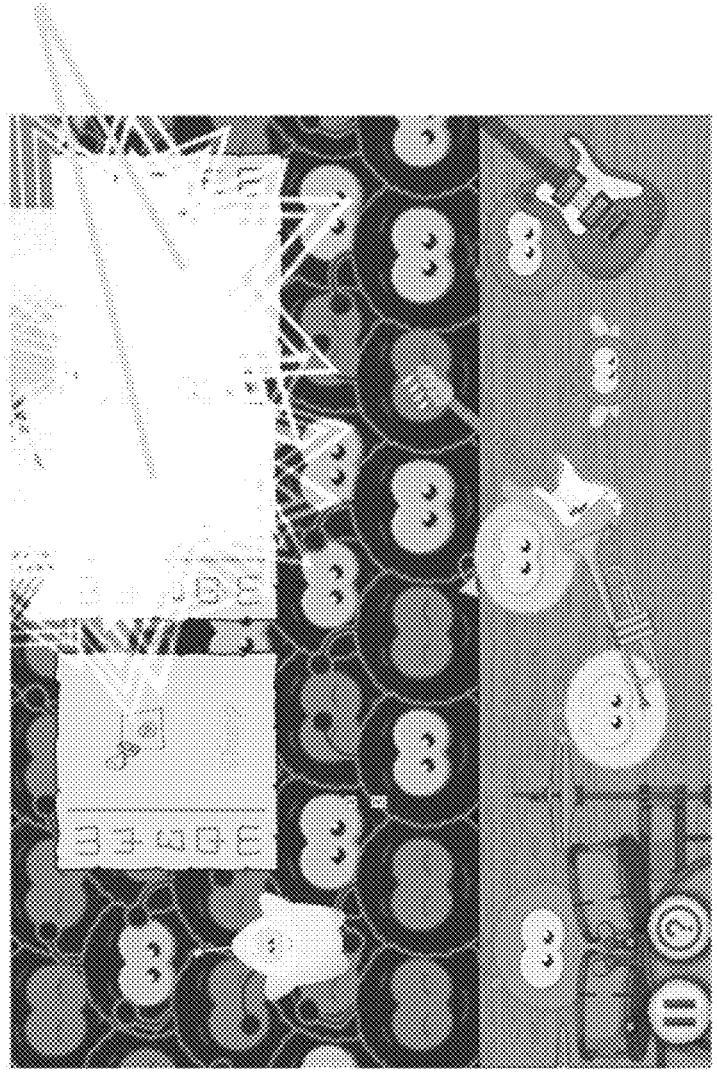
FIG. 9 illustrates a third example of game play for a speech therapy game of the speech therapy application in accordance with certain implementations of the disclosed technology.

FIG. 9 illustrates a third example of game play for a speech therapy game of the speech therapy application in accordance with certain implementations of the disclosed technology.

Figure 10:
FIG. 10 illustrates a fourth example of game play for a speech therapy game of the speech therapy application in accordance with certain implementations of the disclosed technology.

FIG. 10 illustrates a fourth example of game play for a speech therapy game of the speech therapy application in accordance with certain implementations of the disclosed technology.

Figure 11:
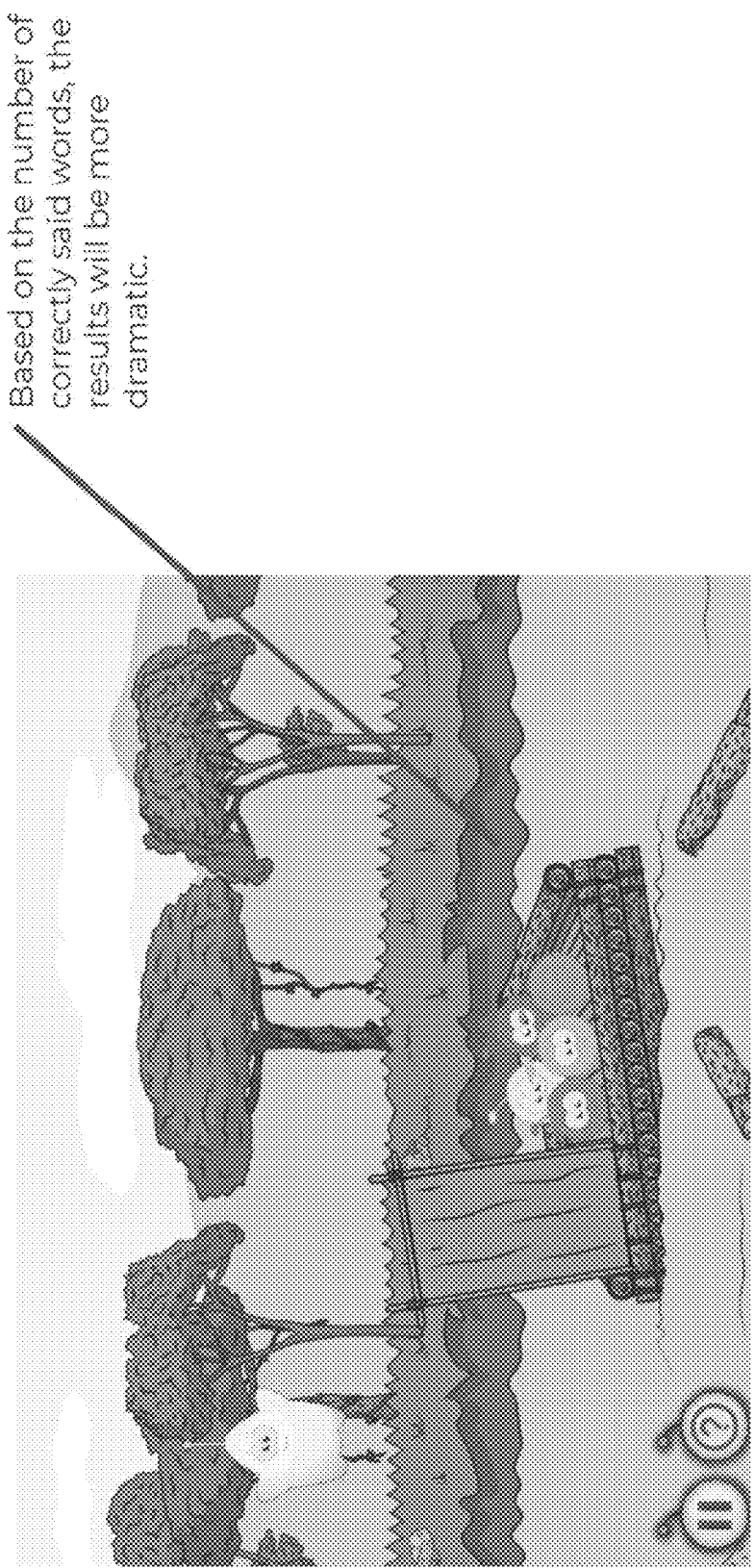
FIG. 11 illustrates a fifth example of game play for a speech therapy game of the speech therapy application in accordance with certain implementations of the disclosed technology.

FIG. 11 illustrates a fifth example of game play for a speech therapy game of the speech therapy application in accordance with certain implementations of the disclosed technology.

Figure 12:
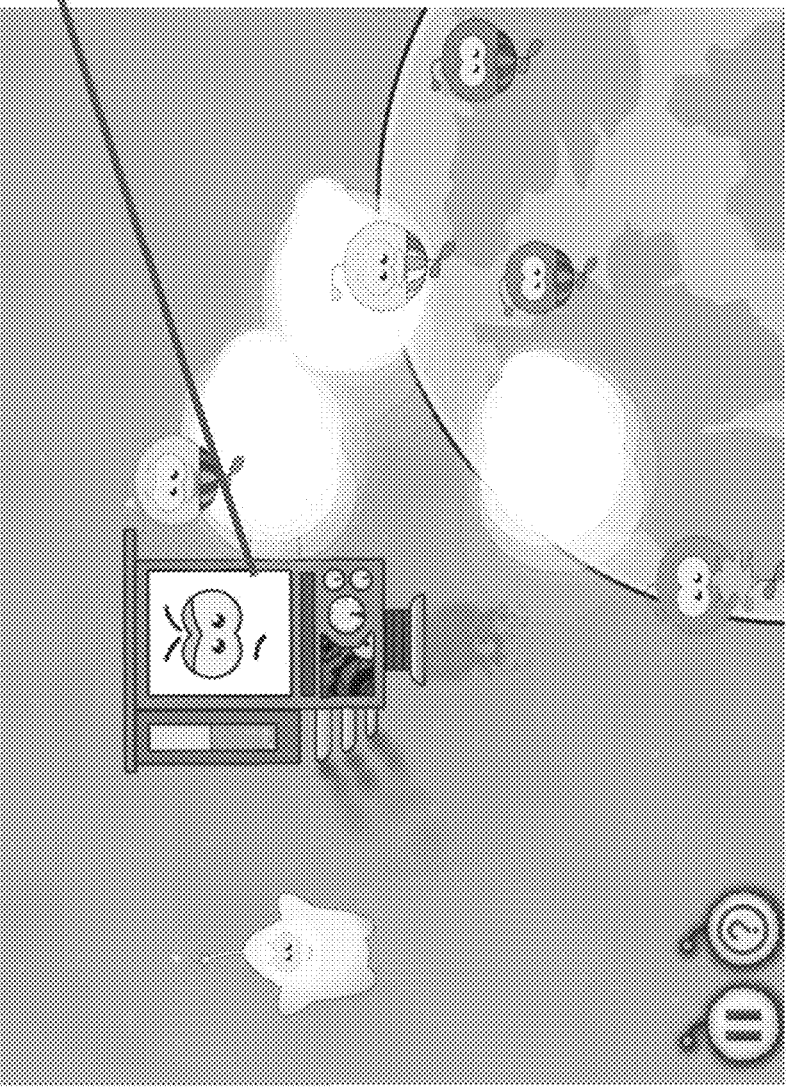
FIG. 12 illustrates a sixth example of game play for a speech therapy game of the speech therapy application in accordance with certain implementations of the disclosed technology.

FIG. 12 illustrates a sixth example of game play for a speech therapy game of the speech therapy application in accordance with certain implementations of the disclosed technology.

Aspects of the disclosure may operate on particularly created hardware, firmware, digital signal processors, or on a specially programmed computer including a processor operating according to programmed instructions. The terms controller or processor as used herein are intended to include microprocessors, microcomputers, Application Specific Integrated Circuits (ASICs), and dedicated hardware controllers.

One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a computer readable storage medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGAs, and the like.

Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or computer-readable storage media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

The previously described versions of the disclosed subject matter have many advantages that were either described or would be apparent to a person of ordinary skill. Even so, these advantages or features are not required in all versions of the disclosed apparatus, systems, or methods.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the invention have been illustrated and described for purposes of illustration, it will be understood that various modifications may be made without departing from the spirit and scope of the invention. Accordingly, the invention should not be limited except as by the appended claims.

The invention claimed is:

1. A computer-implemented method suitable for use with a portable electronic device, the method comprising:
receiving, via an audio input device of the portable electronic device, verbal speech input from a user and converting the received verbal speech input into an audio input signal;
applying, via a machine learning module of the portable electronic device, an acoustic model to the audio input signal;
performing, via an online processing module of the portable electronic device, at least one speech recognition operation on the audio input signal;
performing, via an offline processing module of the portable electronic device, at least one speech recognition operation on the audio input signal;
training the machine learning module using verbal samples, wherein each verbal sample is in one of a plurality of a spoken languages, and wherein the training is concurrent with the performing of the speech recognition operations by the online and offline processing modules;
generating, via an interactive game module of the portable electronic device, user feedback based on results from the at least one speech recognition operation performed by the online processing module and the at least one speech recognition operation by the offline processing module; and
providing, via a user interface of the portable electronic device, the user feedback to the user.

2. The computer-implemented method of claim 1, wherein the acoustic model includes a plurality of phonetic codes that each represent a certain pronunciation of at least one word.

3. The computer-implemented method of claim 1, further comprising determining whether the portable electronic device presently has an active connection with a network.

4. The computer-implemented method of claim 3, wherein the network includes the Internet.

5. The computer-implemented method of claim 3, further comprising toggling via the portable electronic device between the online processing module and the offline processing module based on results of the determining whether the portable electronic device presently has an active connection with a network.

6. The computer-implemented method of claim 1, wherein converting the received verbal speech input into the audio input signal includes separating a voice of the user from background noise.

7. The computer-implemented method of claim 6, wherein the verbal speech input is generated in a public area with significant background noise.

8. The computer-implemented method of claim 1, further comprising determining whether the user has stopped providing verbal speech input.

9. The computer-implemented method of claim 8, further comprising automatically pausing or ceasing operation of the method responsive to a determination that the user has stopped providing verbal speech input.

10. The computer-implemented method of claim 8, further comprising providing to the user via the user interface a request for response from the user responsive to a determination that the user has stopped providing verbal speech input.

11. The computer-implemented method of claim 10, further comprising pausing or ceasing operation of the method responsive to a determination that the user has not provided a response to the request for response within a predetermined period of time.

12. The computer-implemented method of claim 11, wherein the predetermined period of time is 10 seconds.

13. The computer-implemented method of claim 9, further comprising automatically resuming operation of the method responsive to a determination that the user has started providing verbal speech input again.

14. The computer-implemented method of claim 11, further comprising resuming operation of the method responsive to a determination that the user has started providing verbal speech input again.

15. The computer-implemented method of claim 11, further comprising resuming operation of the method responsive to a determination that the user has started providing verbal speech input again for a predetermined period of time.

16. The computer-implemented method of claim 1, wherein the audio input device is a microphone.

17. The computer-implemented method of claim 1, wherein the portable electronic device is a smartphone.

18. The computer-implemented method of claim 1, wherein the portable electronic device is a tablet computing device.

19. The computer-implemented method of claim 1, wherein the user interface is a touchscreen.

20. The computer-implemented method of claim 5, further comprising pausing via the portable electronic device certain operations of the online processing module when the portable electronic device does not have an active connection with a network.

21. The computer-implemented method of claim 20, further comprising resuming via the portable electronic device certain operations of the online processing module when the portable electronic device establishes an active connection with a network.

22. The computer-implemented method of claim 21, wherein resuming certain operations includes generating a score corresponding to the verbal speech input based on data obtained during the pausing.

23. The computer-implemented method of claim 2, wherein the plurality of phonetic codes includes phonetic codes that represent correct pronunciations and phonetic codes that represent mispronunciations.

24. The computer-implemented method of claim 1, wherein the verbal speech input includes a predetermined number of syllables.

25. The computer-implemented method of claim 1, wherein the verbal speech input includes a predetermined number of words.

26. The computer-implemented method of claim 1, wherein the received verbal speech input is limited to a certain period of time.

27. The computer-implemented method of claim 26, further comprising, responsive to the received verbal speech input exceeding the certain period of time, starting another instance of the method with the additional verbal speech input as the received verbal speech input.

28. The computer-implemented method of claim 7, wherein the public area includes an airport, a residential building, an office building, a downtown area, a park, a school, or a speech therapist's office or area of practice.

29. A system, comprising:
an audio input device configured to receive verbal speech input from a user and convert the received verbal speech input into an audio input signal;
an online processing module configured to perform at least one speech recognition operation on the audio input signal;
an offline processing module configured to perform at least one speech recognition operation on the audio input signal, the offline processing module executed on a portable electronic device;
an interactive game module configured to generate user feedback based on results from the at least one speech recognition operation performed by the online processing module and the at least one speech recognition operation by the offline processing module; and
a user interface configured to provide the user feedback to the user, wherein the system is configured to:
determine whether the portable electronic device presently has an active connection with a network;
pause certain operations of the online processing module when the portable electronic device does not have an active connection with a network; and
resume certain operations of the online processing module when the portable electronic device establishes an active connection with a network, wherein resuming certain operations includes generating a score corresponding to the verbal speech input based on data obtained during the pausing.

* * * * *